(12) United States Patent
Wang

(10) Patent No.: US 12,303,057 B2
(45) Date of Patent: May 20, 2025

(54) PHYSICAL NON-STICK PAN WITH CONVEX-CONCAVE STRUCTURE, AND MANUFACTURING METHOD THEREOF

(71) Applicant: ZHEJIANG BAHE KITCHENWARE CO., LTD., Jinhua (CN)

(72) Inventor: Ke Wang, Jinhua (CN)

(73) Assignee: ZHEJIANG BAHE KITCHENWARE CO., LTD., Jinhua (CN)

( * ) Notice: Subject to any disclaimer, the term of this patent is extended or adjusted under 35 U.S.C. 154(b) by 0 days.

(21) Appl. No.: 18/277,390

(22) PCT Filed: May 8, 2020

(86) PCT No.: PCT/CN2020/089170
§ 371 (c)(1),
(2) Date: Aug. 16, 2023

(87) PCT Pub. No.: WO2021/203504
PCT Pub. Date: Oct. 14, 2021

(65) Prior Publication Data
US 2024/0298835 A1    Sep. 12, 2024

(30) Foreign Application Priority Data

Apr. 7, 2020 (CN) .......................... 202010265736.7
Apr. 22, 2020 (CN) .......................... 202010322008.5

(51) Int. Cl.
*A47J 27/022* (2006.01)
*A47J 36/02* (2006.01)
*B21D 51/22* (2006.01)

(52) U.S. Cl.
CPC .......... *A47J 27/022* (2013.01); *A47J 36/025* (2013.01); *B21D 51/22* (2013.01)

(58) Field of Classification Search
CPC ........ A47J 27/022; A47J 36/025; A47J 36/00; B21D 51/22; B23P 2700/05; B23P 15/00
See application file for complete search history.

(56) References Cited

U.S. PATENT DOCUMENTS 4,768,427 A  *  9/1988  Cheng ..................... A47J 37/10
                                                       99/422
5,351,608 A  *  10/1994 Muchin .................... A21B 3/15
                                                       99/422
(Continued)

FOREIGN PATENT DOCUMENTS

CN        1197850 A      11/1998
CN      201052068 Y       4/2008
(Continued)

*Primary Examiner* — Shawn M Braden
(74) *Attorney, Agent, or Firm* — Bayramoglu Law Offices LLC

(57) ABSTRACT

A physical non-stick pan with a convex-concave structure, and a manufacturing method thereof are provided. The physical non-stick pan includes a pan body, where the convex-concave structure is formed on an inner surface of the pan body, the convex-concave structure comprises a convex edge protruding from the inner surface of the pan body and a recess enclosed by the convex edge, and a physical non-stick layer is at least arranged on an inner surface of the pan body in the recess. In the convex-concave structure, the convex edge protects a non-stick layer arranged in the recess, reduces a direct friction between a spatula and the non-stick layer, and prolongs a non-stick effect of the pan body.

7 Claims, 2 Drawing Sheets

1

(56) References Cited

U.S. PATENT DOCUMENTS

| | | | | |
|---|---|---|---|---|
| 5,440,973 A | * | 8/1995 | Welhouse | A47J 37/10 |
| | | | | 99/425 |
| 5,628,426 A | * | 5/1997 | Doyle | A47J 27/022 |
| | | | | 99/425 |
| 5,829,116 A | | 11/1998 | Vilon | |
| 10,040,118 B2 | * | 8/2018 | Groll | B22D 19/0045 |
| 10,194,771 B2 | | 2/2019 | Fu et al. | |
| 2015/0367481 A1 | | 12/2015 | Feng et al. | |

FOREIGN PATENT DOCUMENTS

| | | | | |
|---|---|---|---|---|
| CN | 101396229 | A | | 4/2009 |
| CN | 201861409 | U | | 6/2011 |
| CN | 202874940 | U | * | 4/2013 |
| CN | 103142132 | A | | 6/2013 |
| CN | 203341496 | U | | 12/2013 |
| CN | 103844877 | A | | 6/2014 |
| CN | 105476490 | A | | 4/2016 |
| CN | 107212729 | A | | 9/2017 |
| CN | 107495826 | A | | 12/2017 |
| CN | 109349912 | A | | 2/2019 |
| CN | 208658924 | U | | 3/2019 |
| CN | 209252519 | U | | 8/2019 |
| CN | 110448183 | A | | 11/2019 |
| CN | 111036512 | A | | 4/2020 |
| CN | 111493648 | A | | 8/2020 |
| CN | 211704307 | U | | 10/2020 |
| EP | 0568322 | A2 | | 11/1993 |
| JP | 6797109 | B2 | | 12/2020 |

* cited by examiner

PHYSICAL NON-STICK PAN WITH CONVEX-CONCAVE STRUCTURE, AND MANUFACTURING METHOD THEREOF

CROSS REFERENCE TO THE RELATED APPLICATIONS

This application is the national phase entry of International Application No. PCT/CN2020/089170, filed on May 8, 2020, which is based upon and claims priority to Chinese Patent Applications No. 202010265736.7, filed on Apr. 7, 2020, and No. 202010322008.5, filed on Apr. 22, 2020, the entire contents of which are incorporated herein by reference.

TECHNICAL FIELD

The present disclosure belongs to the field of kitchen utensils, and specifically relates to a physical non-stick pan with a convex-concave structure, and a manufacturing method thereof.

BACKGROUND

An inner surface of the current conventional non-stick pan needs to be sprayed with a chemical non-stick coating, and this chemical non-stick coating is easily decomposed at a high temperature and thus loses efficacy, and is also quickly destroyed under use of a metal spatula. For making a non-stick pan having characteristics such as uneasy sticking, easy cleaning, and fast and even heating, there are many solutions on the market. For example, CN201020591079.7 discloses a solution in which a plurality of grooves are formed on a top surface of a bottom of a pan to form a pattern and a polytetrafluoroethylene (PTFE) non-stick layer is arranged in the grooves. In addition, in CN201310455227.0, the arrangement of a groove pattern is designed in detail, and a length, width, and height of a groove stripe and a size and height of a salient point are clarified; on this basis, a non-stick coating is sprayed; and a surface of a pan body is further polished to obtain a final product.

Although the above solutions can lead to a non-stick effect to some extent, a chemical non-stick coating is used in each of the above solutions. It is well known that a chemical non-stick coating of a non-stick pan is easy to lose its non-stick performance or fall off during cooking at a high temperature, resulting in problems such as sticking of cooked food to the pan and accidental ingestion of the chemical coating.

Therefore, manufacturers of non-stick pans abandon the solutions of arranging a chemical non-stick layer to allow a non-stick effect, and tend to adopt a physical non-stick solution to allow a non-stick effect. The design of a non-stick layer based on a principle of a lotus leaf effect is particularly prominent. The lotus leaf effect is also known as a self-cleaning effect, which is mainly applied to a surface of an object and can allow water-proof and oil-proof effects. Specifically, the principle of the lotus leaf effect is as follows: An upper surface of a lotus leaf is covered with a lot of mastoids having an average size of about 53 µm to 57 µm, and these mastoids each are composed of 6 µm to 13 µm micro-protrusions gathered together. In addition, a surface of each of these mastoids is covered with many small mastoids having an average size of about 6 µm to 8 µm, an average height of about 11 µm to 13 µm, and an average spacing of about 19 µm to 21 µm, and apexes of the small mastoids each are flat and slightly recessed in a center. This mastoid structure can hardly be observed by naked eyes and ordinary microscopes, and is often referred to as a multi-nano/micro-scale ultramicrostructure. These large and small mastoids and protrusions are like "small hills" arranged side by side on the surface of the lotus leaf, and recesses among the "small hills" are filled with air, such that an extremely-thin nano-scale air layer is formed on the surface of the leaf. Water droplets have a minimum diameter of 1 mm to 2 mm (1 mm=1,000 µm), and are much larger than the mastoids on the surface of the lotus leaf. Thus, after rainwater falls on the surface of the lotus leaf, only few contact points are formed between the rainwater and apexes of the "small hills" on the surface of the lotus leaf due to separation of the extremely-thin air layer, such that the rainwater cannot infiltrate the surface of the lotus leaf. Water droplets form spheroids under their own surface tension, and the water spheroids absorb dust during rolling and roll out of the surface of the lotus leaf, thereby allowing an effect of cleaning the surface of the lotus leaf.

It is far from enough to merely apply this structure to a surface of a non-stick pan to form a physical non-stick layer. An extremely-thin air layer is formed on a surface of a lotus leaf in a room temperature environment, and water droplets dropping on a lotus leaf are also at room temperature or even at a temperature lower than room temperature. However, a non-stick pan needs to be further heated, and a temperature of the pan continues to arise and even reach 250° C. or higher. Thus, the simple application of this structure to a non-stick pan cannot completely allow a non-stick effect.

Therefore, characteristics of an operating environment of a non-stick pan can be effectively combined by further optimizing a physical non-stick solution based on the principle of the lotus leaf effect to design a non-stick pan with a physical non-stick mode.

In addition, the simple application of a physical non-stick mode to a surface of a pan body is not enough to allow a long-lasting non-stick effect. Because a spatula needs to repeatedly rub against a surface of a pan during each operation, a physical non-stick layer will be worn due to the long-term friction, such that a long-lasting non-stick effect cannot be allowed, which also needs to be solved urgently.

SUMMARY

An objective of the present disclosure is to provide a physical non-stick pan in which a physical non-stick layer is prevented from being destroyed to allow the pan to have a long-lasting non-stick effect.

In order to achieve the above objective, a main technical solution of the present disclosure is to provide a physical non-stick pan with a convex-concave structure, including a pan body, where a convex-concave structure is uniformly formed on an inner surface of the pan body, the convex-concave structure includes a convex edge protruding from the inner surface of the pan body and a recess enclosed by the convex edge, and a physical non-stick layer is at least arranged on an inner surface of the pan body in the recess. In this solution, since the physical non-stick layer is at least arranged on the inner surface of the pan body in the recess and the convex edge has a height difference from the recess, a spatula can merely be located on a surface of the convex edge when repeatedly scrubbing the inner surface of the pan body; the convex edge is provided to protect the physical non-stick layer in the recess and prevent the physical non-stick layer from being worn, which is conducive to allowing a long-lasting non-stick effect; and the physical non-stick layer includes the lotus leaf surface structure in the lotus leaf effect principle mentioned in the background.

In some embodiments, a side wall of the convex edge in the recess is further provided with the physical non-stick layer. The addition of this structure ensures a non-stick effect for the convex-concave structure; and if this structure is not arranged, the side wall may undergo adhesion.

In some embodiments, the physical non-stick layer includes a rough surface of at least a micro-scale, and an oxide film with a nano-scale rough porous structure is further formed on the rough surface; and a micro- and nano-microscopic rough film layer plays a role in accumulating and locking oil during actual cooking to allow a physical non-stick function. A pore size of the oxide film can change with a change in a heating temperature. After the pan is heated with pork or grease or oil for maintenance in use, the pore size of the oxide film increases with a temperature rise of the pan body and decreases with a temperature fall of the pan body. It should be further noted that, when the pan body is heated by a user, the pore size of the oxide film increases to facilitate the entry and exit of grease; and when the heating of the pan body is stopped, the pan body is gradually cooled, and the pore size of the oxide film decreases, such that grease entering pores is locked in, thereby allowing an oil-locking function.

The shortcomings of the existing physical non-stick principles in a heating state have been explained in the background. In this solution, on the basis of the lotus leaf physical non-stick principle, a hydrophobic effect in an oil-locked state is adopted to allow an actual physical non-stick effect.

In some embodiments, the rough surface is composed of a plurality of mastoids of at least a micro-scale, where the at least a micro-scale should be interpreted as a micro-scale or a nano-scale.

In some embodiments, the rough surface at least has a cover hardness of HV 400 to 1,100, which can minimize the scrape and wear of a spatula for the pan body when the non-stick pan works, and can also prevent the rough surface from being worn when the pan is brushed with a pan-washing tool such as a steel wool.

In some embodiments, an area of the recess is 80% to 95% of an area of the convex-concave structure, and an area of the convex edge is 5% to 20% of the area of the convex-concave structure. Although the convex edge protects the physical non-stick layer in the recess from being shoveled off or worn away. However, no non-stick layer is arranged on a top of the convex edge. Therefore, it is very important to reasonably set a percentage of the area of each of the convex edge and the recess in the area of the convex-concave structure. If the area of the convex edge is too large, a non-stick effect of the pan will be decreased; and if the area of the recess is too large, the protection of the convex edge for the recess will be reduced, and especially during perennial brushing of the pan with a steel wool, the physical non-stick layer in the recess will be gradually destroyed. Such a layout ensures that the arrangement of the convex edge can protect the physical non-stick layer without affecting a non-stick effect.

In some embodiments, the recess has a depression depth of 0.01 mm to 0.13 mm. If the depression depth is too large, when a viscous food (such as eggs) is cooked, a part of the viscous food in the deep recess may be separated from a part of the viscous food on the convex edge due to a large height difference, such that the part of the viscous food remains in the recess and cannot be shoveled out.

In some embodiments, the pan body is a single-layer or multi-layer composite structure.

A manufacturing method of a physical non-stick pan with a convex-concave structure is also provided, including the following steps:
 (1) manufacturing of a convex-concave structure: manufacturing a uniformly-distributed convex-concave structure on a surface of a metal plate through chemical etching or mechanical pressing;
 (2) stretching: using a device to process the metal plate with the convex-concave structure formed into a pan body; and
 (3) sand-blasting: selecting an abrasive, and with compressed air as a power, spraying the abrasive on a surface of the pan body, such that a rough surface of at least a micro-scale is formed on the surface of the pan body.

In some embodiments, the sand-blasting in step (2) includes: selecting a 36-mesh to 130-mesh abrasive, and with 0.4 MPa to 0.8 MPa compressed air as a power, using a high-speed injection device to spray the abrasive on an inner surface of the pan body, such that a rough surface composed of a plurality of mastoids of at least a micro-scale is formed on the surface of the pan body.

In some embodiments, the manufacturing method further includes: (4) surface treatment: hardening and oxidizing the rough surface of the pan body, such that an oxide film with a nano-scale rough porous structure is further formed on the rough surface.

In some embodiments, the surface treatment in step (4) further includes:
 (4.1) hardening: heating the pan body until a surface hardness of the pan body reaches HV 400 to 1,100; and
 (4.2) oxidation: oxidizing the pan body obtained in step (4.1) to further form the oxide film with the nano-scale rough porous structure on the rough surface of the pan body.

In some embodiments, the hardening in step (4.1) includes: cleaning the pan body before the heating, placing the cleaned pan body in a heat treatment furnace, and heating the cleaned pan body for 0.5 h to 24 h in a 400° C. to 650° C. environment, such that a hardened layer with a hardness of HV 400 to 1,100 and a thickness of 3 μm to 35 μm is formed on the surface of the pan body.

In some embodiments, the oxidation in step (4.2) includes: placing the pan body with a hardened layer formed in a treatment furnace filled with a liquid or a gas, and oxidizing for 0.5 h to 2 h in a 400° C. to 500° C. environment.

In some embodiments, the manufacturing method further includes: (5) polishing: mechanically polishing a preset zone of the inner surface of the pan body to remove a rough surface at a convex edge in the convex-concave structure and retain a rough surface on a recess in the convex-concave structure to obtain the pan body for the non-stick pan.

The present disclosure has the following beneficial effects:
 1. A convex-concave structure is arranged, where a convex edge protects a non-stick layer arranged in a recess, reduces a direct friction between a spatula and the non-stick layer, and prolongs a non-stick effect of a pan body.
 2. A lotus leaf-like surface structure is adopted, where in an environment in which the non-stick pan is located, a microscopic rough oxide film can store tiny air to allow a hydrophobic effect.

3. When the non-stick pan is maintained, the oxide film of the non-stick pan can provide an oil-locking function, and even if an inner surface of the pan after maintenance is cleaned with a neutral detergent, the pan still has hydrophobic and physical non-stick functions similar to a non-stick effect of a lotus leaf.
4. Because no chemical non-stick coating is arranged, the non-stick pan is healthy and hygienic when used.

In the figures: pan body: 1; convex-concave structure: 11; convex edge: 111; recess: 112; inner working layer: 12; intermediate thermally-conductive layer: 13; outer heated layer: 14; mastoid: 2; and nano-scale roughness: a.

DETAILED DESCRIPTION OF THE EMBODIMENTS

The technical solutions of the embodiments of the present disclosure are clearly and completely described below with reference to the accompanying drawings in the embodiments of the present disclosure. Apparently, the described embodiments are merely some rather than all of the embodiments of the present disclosure. All other embodiments obtained by persons of ordinary skill in the art based on the embodiments of the present disclosure shall fall within the protection scope of the present disclosure.

It should be understood by those skilled in the art that in the description of the present disclosure, terms such as "longitudinal", "transverse" "upper", "lower", "front", "rear", "left", "right", "vertical", "horizontal", "top", "bottom", "inside", and "outside" indicate orientation or position relationships shown based on the accompanying drawings. These terms are merely intended to facilitate and simplify the description of the present disclosure, rather than to indicate or imply that the mentioned device or component must have a specific orientation or must be constructed and operated in a specific orientation. Therefore, these terms should not be construed as a limitation to the present disclosure.

It should be understood that the term "one" indicates "at least one" or "one or more", that is, in an embodiment, there may be one component, and in another embodiment, there may be a plurality of components. The term "one" cannot be understood as a limitation to a number.

Embodiment 1

Figure 1:
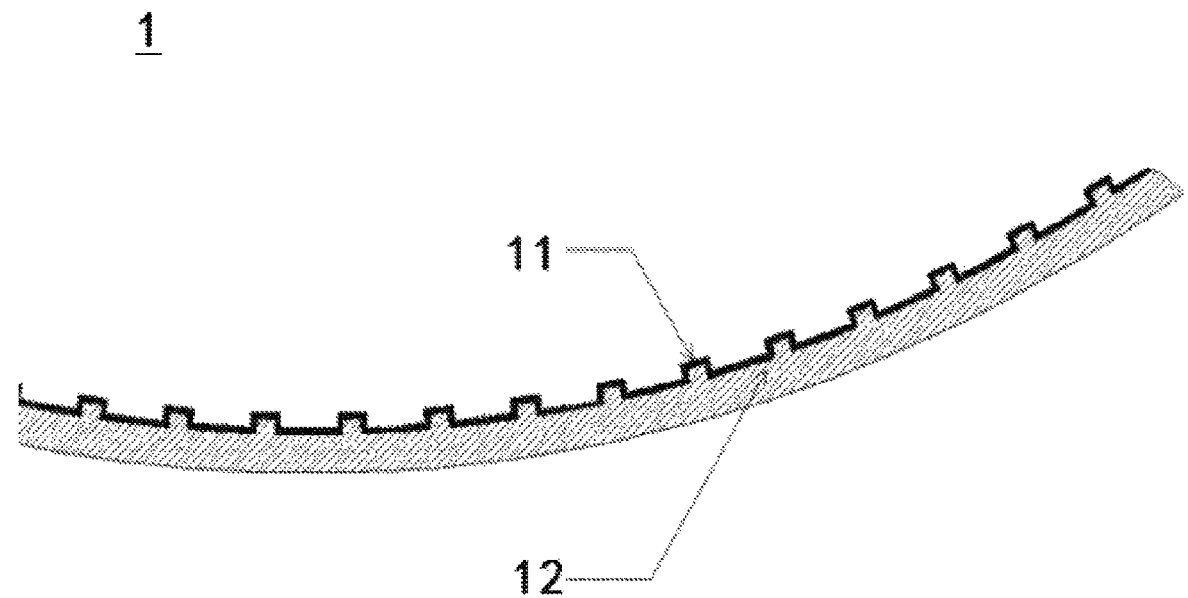
FIG. 1 is a schematic structural diagram of an embodiment of the present disclosure.
Figure 2:
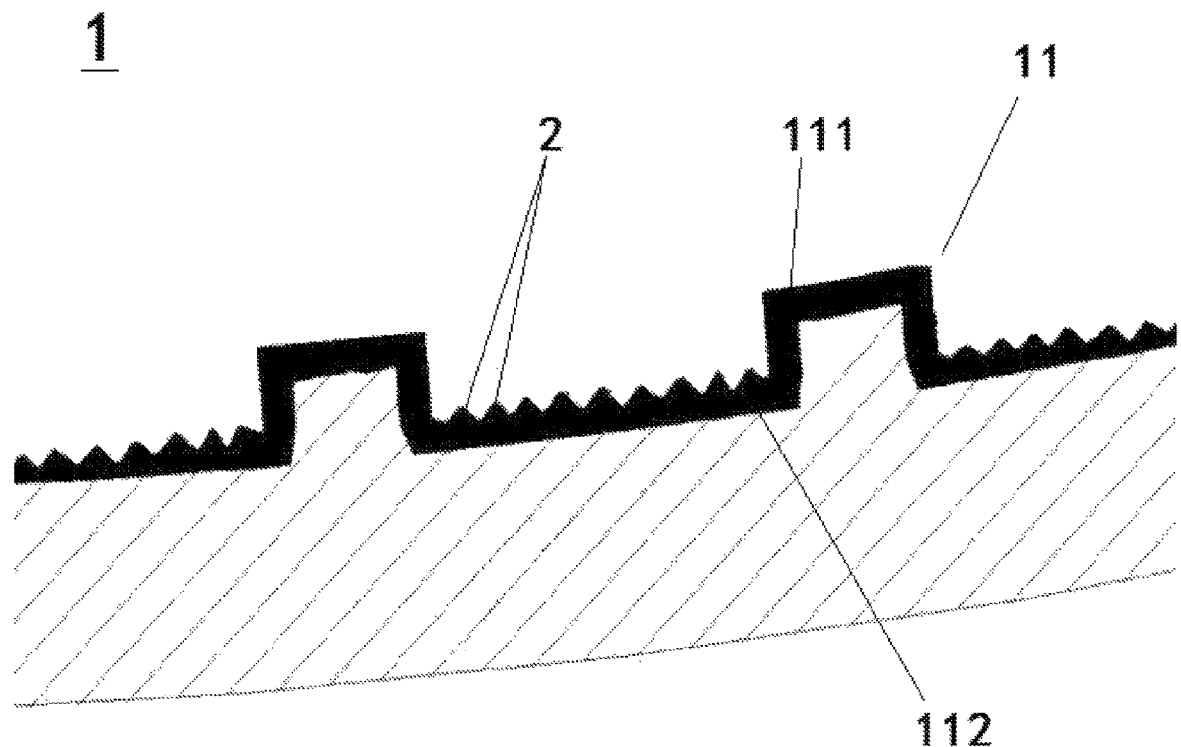
FIG. 2 is a schematic structural diagram of a convex-concave structure in the embodiment of FIG. 1 in combination with a rough surface.
Figure 3:
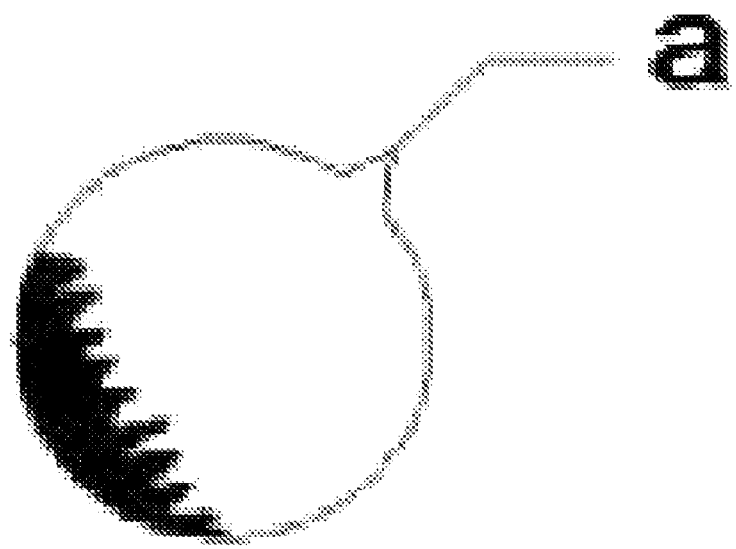
FIG. 3 is a schematic structural diagram of nano-scale roughness on a mastoid in the embodiment of FIG. 1.
Figure 4:
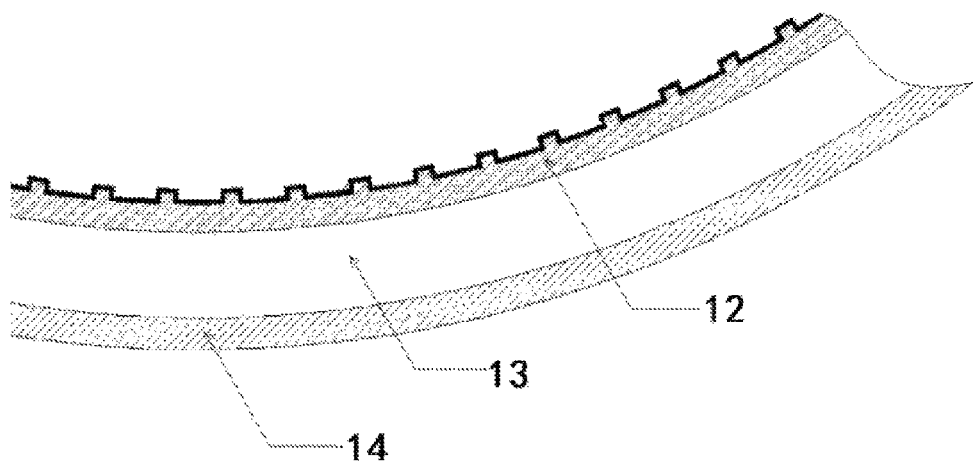
FIG. 4 is a schematic diagram of a pan body with a multilayer structure in the embodiment of FIG. 1.

As shown in FIG. 1 to FIG. 4 for the specification of the present disclosure, a physical non-stick pan with a convex-concave structure according to a preferred embodiment of the present disclosure is described; and a type of the non-stick pan includes a stew pan, a frying pan, a wok, or the like. In this embodiment, with a wok as an example, the non-stick pan includes pan body 1; the pan body 1 may have a single-layer or multi-layer structure; and when the pan body 1 has a single-layer structure, a material of the pan body can be iron or stainless steel, and alloying elements in the stainless steel are Cr, Ni, Ti, Mn, N, Nb, Mo, Si, and Cu, where Cr is a main alloying element. For example, as shown in FIG. 1 and FIG. 2, the pan body 1 has a single-layer structure including inner working layer 12. When the pan body 1 has a multi-layer structure, a material of the pan body can be iron, stainless steel, or a composite material. However, regardless of a single-layer structure or a multi-layer structure, at least a material of an inner surface of the pan body 1 is iron or stainless steel. For example, as shown in FIG. 3, the pan body 1 has a multi-layer structure including inner working layer 12, intermediate thermally-conductive layer 13, and outer heated layer 14 sequentially from inside to outside, where at least a surface material of the inner working layer 12 is iron or stainless steel. In addition, a surface material of the pan body 1 cannot be an aluminum alloy; an inner surface of the pan body 1 has a physical non-stick layer, and the physical non-stick layer includes a rough surface of at least a micro-scale, and the at least a micro-scale should be interpreted as a micro-scale or a nano-scale; an oxide film with a nano-scale rough porous structure is further formed on the rough surface; a micro- and nano-microscopic rough film layer plays a role in accumulating and locking oil during actual cooking to allow a physical non-stick function; and it should be noted that the nano-scale roughness formed by the oxide film is mainly produced by oxide particles resulting from an oxidation, such as an oxide (iron oxide) of an iron pan and an oxide film of stainless steel (with chromium trioxide as a main component). A pore size of the oxide film can change with a change of a heating temperature, because the oxide film is generated from a matrix metal, combined with a metal matrix as a whole, and is firmly bonded with the matrix. In addition, the oxide film has excellent heat resistance.

Specifically, the rough surface is composed of a plurality of mastoids 2 of at least a micro-scale, and the rough surface at least has a cover hardness of HV 400 to 1,100; convex-concave structure 11 is uniformly formed on an inner surface of the pan body 1, and the convex-concave structure 11 includes convex edge 111 protruding from an inner surface of a bottom wall of the pan body and recess 112 enclosed by the convex edge 111; and a physical non-stick layer is at least arranged on an inner surface of the pan body in the recess 112. A side wall of the convex edge 111 in the recess 112 is further provided with the physical non-stick layer, where the addition of this structure ensures a non-stick effect for the convex-concave structure; and if this structure is not arranged, the side wall may undergo adhesion. The convex edge 111 is arranged to protect the physical non-stick layer on an inner surface of the pan body in the recess 112, where if the convex edge 111 is not arranged, a spatula will directly and repeatedly contact and rub the physical non-stick layer during cooking, and after a long time of such working, the rough surface will be worn and thus cannot further exert a non-stick effect. An area of the recess 112 is 80% to 95% of an area of the convex-concave structure 11, an area of the convex edge 111 is 5% to 20% of the area of the convex-concave structure 11, and the recess 112 has a depression depth of 0.01 mm to 0.13 mm. In this embodiment, the recess preferably has a depression depth of 0.05 mm to 0.06 mm. If the depression depth is too large, when a viscous food (such as eggs) is cooked, a part of the viscous food in the deep recess may be separated from a part of the viscous food on the convex edge due to a large height difference, such that the part of the viscous food remains in the recess and cannot be shoveled out. In summary, in this solution, since the physical non-stick layer is at least arranged on the inner surface of the pan body in the recess and the convex edge has a height difference from the recess, a spatula can merely be located on a surface of the convex edge when repeatedly rubbing the inner surface of the pan body. Thus, the convex edge is provided to protect the physical non-stick layer in the recess and prevent the physical non-stick layer from being worn, which is conducive to allowing a long-lasting non-stick effect.

After the pan is heated with pork or grease or oil by a user for maintenance in initial use, the pore size of the oxide film increases with a temperature rise of the pan body and decreases with a temperature fall of the pan body 1. It should be further noted that, when the pan body 1 is heated by a user, the pore size of the oxide film increases to facilitate the entry and exit of grease; and when the heating of the pan body 1 is stopped, the pan body 1 is gradually cooled, and the pore size of the oxide film decreases, such that grease entering pores is locked in, thereby allowing an oil-locking function. The shortcomings of the existing physical non-stick principles in a heating state have been explained in the background. In this solution, on the basis of the lotus leaf physical non-stick principle, a water-repellent effect in an oil-locked state is adopted to allow an actual physical non-stick effect.

It should be particularly noted that in the current experiments, when the above structure is adopted, an iron pan and a stainless steel pan can allow the above oil-locking effect; and an aluminum pan cannot allow the effect, where a micro- and nano-scale rough surface can be formed through hard anode oxidization on the aluminum pan, but exhibits a poor non-stick effect, and thus a non-stick effect can only be allowed through a coating.

Embodiment 2

A manufacturing method of the non-stick pan in Embodiment 1 is described, including the following steps:
(1) Manufacturing of the pan body 1: A plate is processed into the pan body 1.
(2) Sand-blasting: An abrasive is selected, and with compressed air as a power, the abrasive is sprayed on a surface of the pan body 1, such that a rough surface of at least a micro-scale is formed on the surface of the pan body 1.
(3) Surface treatment: The rough surface of the pan body 1 is hardened and oxidized, such that an oxide film with a nano-scale rough porous structure is further formed on the rough surface.
(4) Polishing: A preset zone of the inner surface of the pan body 1 is mechanically polished to remove a rough surface at the convex edge 111 in the convex-concave structure 11 and retain a rough surface on the recess 112 in the convex-concave structure 11 to obtain the pan body 1 for the non-stick pan. Because no non-stick layer is arranged on a top of the convex edge, such a layout ensures that the arrangement of the convex edge can protect the physical non-stick layer without affecting a non-stick effect.
(5) Cleaning and packaging: The pan body 1 is treated with ultrasonic waves to remove a polishing wax, then cleaned with deionized hot water, and then riveted with a handle to obtain a finished product.

Specifically, in this embodiment, the manufacturing of the pan body 1 in step (1) further includes:
(1.1) Manufacturing of the convex-concave structure 11: A uniformly-distributed convex-concave structure 11 is manufactured on a surface of an iron or stainless steel plate through chemical etching or mechanical pressing. The recess has a depression depth of 0.01 mm to 0.13 mm and preferably 0.05 mm to 0.06 mm. If the depression depth is too large, during cooking, a food may remain in the recess 112 and cannot be shoveled out. A cross section of the convex edge 111 in the convex-concave structure 11 may be semicircular or rectangular. The convex-concave structure 11 is formed on the surface of the iron or stainless steel plate through chemical etching or engraving or rolling, where the engraving includes cutting engraving and laser engraving; the mechanical pressing is used widely; and the laser engraving can lead to an accurate pattern. After the chemical etching or mechanical pressing, an area of the convex edge 111 is 5% to 20% of an area of the convex-concave structure 11, and an area of the recess 112 is 80% to 95% of the area of the convex-concave structure 11. The above two area proportions are merely values generated in this embodiment, and generally, it is only necessary to minimize a proportion of the area of the convex edge 111 and increase a proportion of the area of the recess 112. When a metal spatula is used during cooking, the metal spatula does not destroy the hard physical non-stick layer at the recess to allow a long-lasting physical non-stick effect for the pan.
(1.2) Stretching: The iron or stainless steel plate with the convex-concave structure 11 formed is stretched into the pan body 1 by a stretching machine, and an edge of the pan body is trimmed and smoothed. The pan body 1 has a thickness of 0.3 mm to 8 mm and preferably 0.6 mm to 5 mm.

In this embodiment, the sand-blasting in step (2) includes: a 36-mesh to 130-mesh abrasive is selected, and with 0.4 MPa to 0.8 MPa compressed air as a power, a high-speed injection device (such as a spray gun) is used to spray the abrasive on an inner surface of the pan body 1 to thoroughly remove impurities on the inner surface, such that a rough surface composed of a plurality of mastoids of at least a micro-scale is formed on the surface of the pan body 1, where the abrasive is brown corundum, white corundum, or the like.

In this embodiment, the surface treatment in step (3) further includes:
(3.1) Hardening: The pan body 1 obtained after the sand-blasting is cleaned, and the cleaned pan body 1 is placed in a heat treatment furnace filled with a gas or a liquid and then heated for 0.5 h to 24 h in a 400° C. to 650° C. environment, such that a hardened layer with a hardness of HV 400 to 1,100 and a thickness of 3 μm to 35 μm is formed on the surface of the pan body 1.
(3.2) Oxidation: The pan body 1 obtained in step (4.1) is oxidized, that is, the pan body 1 with the hardened layer formed is placed in a treatment furnace filled with a gas or a liquid and then oxidized for 0.5 h to 2 h in a 400° C. to 500° C. environment to further form the oxide film with the nano-scale rough porous structure on the rough surface of the pan body 1.

It should be further noted that the hardening and the oxidation can be conducted in a same treatment furnace, or can be conducted separately. In addition, after the hardening and the oxidation are completed, it can be observed under a microscope that a micro-scale rough surface with a thickness of 3 μm to 35 μm and a hardness of HV 400 to 1,100 is formed on the surface of the pan body 1, and an oxide film with a nano-scale rough porous structure is further formed on the rough surface, such that this surface structure becomes a physical non-stick layer with non-stick characteristics. In this case, a rough surface and an oxide film with a nano-scale rough porous structure are also formed on a surface of the convex edge 111.

In this embodiment, in order to remove the rough surface on the convex edge 111, the polishing in step (4) of the manufacturing method of the non-stick pan is specifically as follows: in order to prevent the micro-nano structure on the inner surface of the pan from being destroyed, the inner surface of the pan is polished with a soft cloth wheel to remove the rough surface on the convex edge 111, such that the surface of the convex edge 111 becomes relatively smooth; and an outer surface of the pan is polished with a 60-mesh to 320-mesh nylon wheel, which can effectively prevent the pan body 1 from slipping on a gas stove.

Reviews:

It can be seen from Embodiment 1 and Embodiment 2 that the above embodiments of the present disclosure allow the following technical effects:

After the pan body 1 is hardened and oxidized through a heat treatment, the pan body becomes dark-gray or black, which is favored by general consumers. However, a general metal-based pan is prone to adhesion in use. Thus, in the present disclosure, a physical non-stick layer with a hardened micro-scale or nano-scale rough surface is further arranged on an inner surface of a pan. When the pan is heated with pork or grease or oil by a consumer for maintenance in initial use, a pore size of the nano-scale rough oxide film increases with a temperature rise of the pan body 1, such that the pork or grease or oil enters through pores; when the heating of the pan body 1 is stopped, the pan body 1 is gradually cooled, and the pore size of the nano-scale rough oxide film decreases, such that the grease is locked in, thereby allowing an oil-accumulating effect; and when the pan body 1 needs to be heated for cooking the next time, the grease enters and exits once again. The combination of the rough surface with a micro- or nano-structure and the oil-locking effect is adopted to avoid adhesion to the pan, thereby allowing a physical non-stick effect. Even if the inner surface of the pan after maintenance is cleaned with a neutral detergent, the pan still has hydrophobic and physical non-stick functions similar to a non-stick effect of a lotus leaf.

In the present disclosure, based on a bionic principle of the lotus leaf effect, an overall design is conducted with reference to characteristics of a use environment of the pan body 1; and a micro-scale or nano-scale rough structure is formed on an inner surface of the pan body 1 and an oxide film with a nano-scale rough porous structure and an oil-locking function is further formed on the rough surface, such that a non-stick effect can be allowed without spraying a chemical coating. In addition, the present disclosure changes the long-term industry view that a bottom of a pan should be as smooth as possible to allow a non-stick function, leads to an unexpected non-stick effect, and effectively solves the problem that the industry has long relied on a chemical coating to improve a non-stick effect and cannot avoid the failure or easy fall-off of a non-stick layer during cooking at a high temperature, making people's diets healthy. It should be particularly noted that the present disclosure creatively propose the formation of a submillimeter-scale, micro-scale, and/or nano-scale multi-element rough structure on the inner surface of the pan body 1 according to a bionic principle of the lotus leaf effect to allow a non-stick effect without spraying a chemical coating; and the combination of process parameters for the sand-blasting, heat treatment, and oxidations mentioned in the present disclosure is an important factor for ensuring an optimal non-stick effect, and the combination of process parameters is also one of the invention points of the present disclosure. During the formation of the micro-scale and nano-scale rough surface and the formation of the hardened layer, process parameters for the sand-blasting and heat treatments need to be strictly controlled to allow a desired non-stick effect. The process parameters proposed by the present disclosure are determined by the inventors through a large number of experiments and repeated correction, and are not given by those skilled in the art through imagination or simple reasoning. To allow the desired non-stick effect, it is necessary to adopt a combination of the process parameters in the present disclosure.

The present disclosure is not limited to the above optional embodiments, and anyone may derive other products in various forms under the enlightenment of the present disclosure. However, regardless of any changes in the shape or structure, any technical solutions the same as or similar to the present disclosure should fall within the protection scope of the present disclosure.

What is claimed is:

1. A physical non-stick pan with a convex-concave structure, comprising a pan body, wherein the convex-concave structure is uniformly formed on an inner surface of the pan body, the convex-concave structure comprises a convex edge protruding from the inner surface of the pan body and a recess enclosed by the convex edge, and a physical non-stick layer is at least arranged on the inner surface of the pan body in the recess, wherein the physical non-stick layer comprises a surface including alternating triangular-shaped features forming an outwardly sawtooth profile.

2. The physical non-stick pan with the convex-concave structure according to claim 1, wherein a side wall of the convex edge is further provided with the physical non-stick layer.

3. The physical non-stick pan with the convex-concave structure according to claim 1, wherein, the surface further includes an oxide film with a porous structure.

4. The physical non-stick pan with the convex-concave structure according to claim 3, wherein the surface at least has a cover hardness of HV 400 to 1,100.

5. The physical non-stick pan with the convex-concave structure according to claim 1, wherein an area of the recess is 80% to 95% of an area of the convex-concave structure, and an area of the convex edge is about 5% to 20% of the area of the convex-concave structure.

6. The physical non-stick pan with the convex-concave structure according to claim 1, wherein the recess has a depression depth of 0.01 mm to 0.13 mm.

7. The physical non-stick pan with the convex-concave structure according to claim 1, wherein the pan body is a single-layer or multi-layer composite structure.

* * * * *